(12) United States Patent
Liu et al.

(10) Patent No.: US 11,039,405 B2
(45) Date of Patent: Jun. 15, 2021

(54) POWER HEADROOM REPORT METHOD AND DEVICE

(71) Applicant: Telefonaktiebolaget LM Ericsson (publ), Stockholm (SE)

(72) Inventors: Jinhua Liu, Beijing (CN); Min Wang, Luleå (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 16/644,862

(22) PCT Filed: Sep. 5, 2018

(86) PCT No.: PCT/CN2018/104079
§ 371 (c)(1),
(2) Date: Mar. 5, 2020

(87) PCT Pub. No.: WO2019/047839
PCT Pub. Date: Mar. 14, 2019

(65) Prior Publication Data
US 2020/0288411 A1   Sep. 10, 2020

(30) Foreign Application Priority Data

Sep. 8, 2017 (WO) ................ PCT/CN2017/100982

(51) Int. Cl.
*H04W 52/36* (2009.01)
(52) U.S. Cl.
CPC ................. *H04W 52/365* (2013.01)

(58) Field of Classification Search
None
See application file for complete search history.

(56) References Cited

U.S. PATENT DOCUMENTS

| 2013/0182658 A1 | 7/2013 | Xu et al. | |
| 2016/0029235 A1* | 1/2016 | Kim | H04W 24/08 370/252 |
| 2016/0037463 A1* | 2/2016 | Siomina | H04W 52/383 370/330 |

(Continued)

FOREIGN PATENT DOCUMENTS

| CN | 102083129 A | 6/2011 |
| CN | 104780561 A | 7/2015 |

(Continued)

OTHER PUBLICATIONS

Unknown, Author, "3rd Generation Partnership Project; Technical Specification Group Radio Access Network; Evolved Universal Terrestrial Radio Access (E-UTRA); Medium Access Control (MAC) protocol specification (Release 14) The present", 3GPP TS 36.321 V14.2.0, Mar. 2017, pp. 1-106.

(Continued)

*Primary Examiner* — Mohammed Rachedine
(74) *Attorney, Agent, or Firm* — Murphy, Bilak & Homiller, PLLC (57) ABSTRACT

A terminal device generates a power headroom report (PHR) according to a PHR configuration and a PHR media access control (MAC) control element (CE) format for a PHR carrier group and transmitting the PHR to a network device. The PHR carrier group is associated with one or more carriers.

28 Claims, 7 Drawing Sheets

(56) References Cited

U.S. PATENT DOCUMENTS

2016/0142984 A1* 5/2016 Lee .................. H04W 72/0413
370/329
2019/0268861 A1* 8/2019 Takeda .............. H04W 72/0473

FOREIGN PATENT DOCUMENTS

| CN | 105991261 A | 10/2016 | | |
|---|---|---|---|---|
| NO | 2016164109 A1 | 10/2016 | | |
| WO | WO-2015093746 A1 * | 6/2015 | ........ | H04W 72/0413 |

OTHER PUBLICATIONS

Unknown, Author, "3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331 V14.2.2, Apr. 2017, pp. 1-721.
"PHR for wider bandwidth operation", 3GPP TSG-RAN2 WG2 Meeting RAN2 &9, R2-1709064, LG Electronics Inc., Berlin, Germany, Aug. 21-25, 2017, 4 pages.
"PHR operation for Dual Connectivity", 3GPP TSG-RAN WG2 Meeting #85, R2-140056, Huawei, HiSilicon, Prague, Czech Republic, Feb. 10-14, 2014, 3 pages.
"Power headroom report in NR", 3GPP TSG-RAN WG2 099, Tdoc R2-1708199, Ericsson, Berlin, Germany, Aug. 21-25, 2017, 6 pages.

\* cited by examiner

| C$_7$ | C$_6$ | C$_5$ | C$_4$ | C$_3$ | C$_2$ | C$_1$ | R |
|---|---|---|---|---|---|---|---|
| P | V | \multicolumn{6}{l}{PH (Type 2, PCell)} |
| R | R | \multicolumn{6}{l}{P$_{CMAX,c}$ 1} |
| P | V | \multicolumn{6}{l}{PH (Type 1, PCell)} |
| R | R | \multicolumn{6}{l}{P$_{CMAX,c}$ 2} |
| P | V | \multicolumn{6}{l}{PH (Type x, SCell 1)} |
| R | R | \multicolumn{6}{l}{P$_{CMAX,c}$ 3} |

...

| P | V | PH (Type x, SCell n) |
|---|---|---|
| R | R | P$_{CMAX,c}$ m |

FIG. 2B

| C$_7$ | C$_6$ | C$_5$ | C$_4$ | C$_3$ | C$_2$ | C$_1$ | R |
|---|---|---|---|---|---|---|---|
| P | V | \multicolumn{6}{l}{PH (Type 2, PCell)} |
| R | R | \multicolumn{6}{l}{P$_{CMAX,c}$ 1} |
| P | V | \multicolumn{6}{l}{PH (Type 2, PUCCH SCell)} |
| R | R | \multicolumn{6}{l}{P$_{CMAX,c}$ 2} |
| P | V | \multicolumn{6}{l}{PH (Type 1, PCell)} |
| R | R | \multicolumn{6}{l}{P$_{CMAX,c}$ 3} |
| P | V | \multicolumn{6}{l}{PH (Type x, SCell 1)} |
| R | R | \multicolumn{6}{l}{P$_{CMAX,c}$ 4} |

...

| P | V | PH (Type x, SCell n) |
|---|---|---|
| R | R | P$_{CMAX,c}$ m |

FIG. 2C

| $C_7$ | $C_6$ | $C_5$ | $C_4$ | $C_3$ | $C_2$ | $C_1$ | R |
|---|---|---|---|---|---|---|---|
| $C_{15}$ | $C_{14}$ | $C_{13}$ | $C_{12}$ | $C_{11}$ | $C_{10}$ | $C_9$ | $C_8$ |
| $C_{23}$ | $C_{22}$ | $C_{21}$ | $C_{20}$ | $C_{19}$ | $C_{18}$ | $C_{17}$ | $C_{16}$ |
| $C_{31}$ | $C_{30}$ | $C_{29}$ | $C_{28}$ | $C_{27}$ | $C_{26}$ | $C_{25}$ | $C_{24}$ |
| P | V | PH (Type 2, PCell) ||||||
| R | R | $P_{CMAX,c}$ 1 ||||||
| P | V | PH (Type 1, PCell) ||||||
| R | R | $P_{CMAX,c}$ 2 ||||||
| P | V | PH (Type x, SCell 1) ||||||
| R | R | $P_{CMAX,c}$ 3 ||||||
| ... ||||||||
| P | V | PH (Type x, SCell n) ||||||
| R | R | $P_{CMAX,c}$ m ||||||

FIG. 2D

| $C_7$ | $C_6$ | $C_5$ | $C_4$ | $C_3$ | $C_2$ | $C_1$ | R |
|---|---|---|---|---|---|---|---|
| $C_{15}$ | $C_{14}$ | $C_{13}$ | $C_{12}$ | $C_{11}$ | $C_{10}$ | $C_9$ | $C_8$ |
| $C_{23}$ | $C_{22}$ | $C_{21}$ | $C_{20}$ | $C_{19}$ | $C_{18}$ | $C_{17}$ | $C_{16}$ |
| $C_{31}$ | $C_{30}$ | $C_{29}$ | $C_{28}$ | $C_{27}$ | $C_{26}$ | $C_{25}$ | $C_{24}$ |
| P | V | PH (Type 2, PCell) ||||||
| R | R | $P_{CMAX,c}$ 1 ||||||
| P | V | PH (Type 2, PUCCH SCell) ||||||
| R | R | $P_{CMAX,c}$ 2 ||||||
| P | V | PH (Type 1, PCell) ||||||
| R | R | $P_{CMAX,c}$ 3 ||||||
| P | V | PH (Type x, SCell 1) ||||||
| R | R | $P_{CMAX,c}$ 4 ||||||
| ... ||||||||
| P | V | PH (Type x, SCell n) ||||||
| R | R | $P_{CMAX,c}$ m ||||||

POWER HEADROOM REPORT METHOD AND DEVICE

TECHNICAL FIELD

Embodiments of the present disclosure generally relate to the field of communications, and more particularly, to a method and device for reporting power headroom report (PHR).

BACKGROUND

In order to assist the eNodeB to schedule the uplink transmission resources to different user equipment in an appropriate way, it is important that the user equipment can report its available power headroom to eNodeB.

The eNodeB can use the power headroom reports (PHR) to determine how much more uplink bandwidth per subframe a user equipment is capable of using with the available power. This helps to avoid allocating uplink transmission resources to user equipments which are unable to use them with the available power resources.

In 3GPP TS 36.331-e220, the PHR configuration for a UE is configured in the MAC-MainConfig IE. There are both configurations with respect to the PHR triggering and the MAC CE format for PHR content carrying. One set of parameters are applied for aggregated carriers belong to one MAC entity.

New radio, NR will support carrier frequencies from below 1 GHz to 100 GHz. For such huge frequency range, the attenuation characteristics can be very different between carriers with large frequency difference.

SUMMARY

The summary is provided to introduce a selection of concepts in a simplified form that are further described below in detailed description. This summary is not intended to identify key features or essential features of the claimed subject matter, nor is it intended to be used to limit the scope of the claimed subject matter.

In a carrier aggregation scenario for New radio, NR, the operating frequency may span from a low range (e.g., below 6 GHz) up to a high range (e.g., above 30 GHz), so the propagation may vary considerably between carriers. In the existing solutions, all carriers share the same MAC entity and use the same PHR configuration, including triggering setting and the timer setting. The application of a uniform PHR for all carriers would result in that either PHR overhead is increased due to too frequent PHR triggering for some carriers or suboptimal PHR for some carriers due to too late or too sparse PHR triggering. Such that there is a need to provide an efficient operation scheme for reporting PHR considering the propagation differentiation.

In general, embodiments of the present disclosure provide a solution for solving the issue of reporting PHR as discussed above.

In a first aspect, a method implemented at a terminal device is provided. The terminal device generates a power headroom report (PHR) according to a PHR configuration and a PHR media access control (MAC) control element (CE) format for a PHR carrier group. Then the terminal device transmits the PHR to a network device. The PHR carrier group is associated with one or more carriers.

In one embodiment, the terminal device may further receive information of the PHR configuration and/or the PHR carrier group configuration.

In one embodiment, the PHR carrier group is derived by the terminal device according to a predefined rule.

In one embodiment, the PHR carrier group corresponds to a frequency range and a PHR configuration.

In one embodiment, the PHR configuration for a PHR carrier group comprises one or more of periodicPHR-Timer, prohibitPHR-Timer and dl-PathlossChange.

In one embodiment, the higher frequency range the PHR carrier group corresponds to, the PHR carrier group has a PHR configuration of smaller periodicPHR-Timer, smaller prohibitPHR-Timer and larger dl-PathlossChange.

In one embodiment, a plurality of terminal devices in a serving cell whose carriers are in the same frequency range are configured with common PHR configurations conveyed via a system broadcast signaling.

In one embodiment, the PHR carrier group and the PHR configuration are UE-specific; each terminal device has a PHR configuration for a PHR carrier group.

In one embodiment, the information on the PHR configuration and/or the PHR carrier group is/are transmitted via a dedicated radio resource control signaling.

In one embodiment, the terminal device is configured with more than one PHR carrier groups and the PHR for each PHR carrier group is triggered and transmitted independently.

In one embodiment, the more than one PHR carrier groups configured to the terminal device correspond to at least a first PHR configuration and a second PHR configuration, the running of prohibitPHR-Timer according to the first PHR configuration does not block the PHR according to the second PHR configuration.

In one embodiment, the PHR for a PHR carrier group is transmitted based on specific PHR MAC CE format configuration.

In one embodiment, the PHR triggered for the PHR carrier group is transmitted on a carrier belonging to the PHR carrier group.

In a second aspect, a method implemented at a network device is provided. The network device receives a PHR from a terminal device. The PHR is generated by the terminal device according to a PHR configuration and a PHR MAC CE format for a PHR carrier group. The PHR carrier group is associated with one or more carriers.

In one embodiment, the network device may further transmit information of the PHR configuration and/or the PHR carrier group configuration to the terminal device.

In one embodiment, the information of the PHR configuration and/or the PHR carrier group configuration is derived by the network device according to a predefined rule.

In one embodiment, the PHR carrier group corresponds to a frequency range and a PHR configuration.

In one embodiment, PHR configuration for a PHR carrier group comprises one or more of periodicPHR-Timer, prohibitPHR-Timer and dl-PathlossChange.

In one embodiment, the higher frequency range the PHR carrier group corresponds to, the PHR carrier group has a PHR configuration of smaller periodicPHR-Timer, smaller prohibitPHR-Timer and larger dl-PathlossChange.

In one embodiment, a plurality of terminal devices in a serving cell whose carriers are in the same frequency range are configured with common PHR configurations conveyed via a system broadcast signaling.

In one embodiment, the PHR carrier group and the PHR configuration are UE-specific; each terminal device has a PHR configuration for a PHR carrier group.

In one embodiment, the information on the PHR configuration and/or the PHR carrier group is/are transmitted via a dedicated radio resource control signaling.

In one embodiment, the terminal device is configured with more than one PHR carrier groups and the PHR for each PHR carrier group is triggered and transmitted independently.

In one embodiment, the more than one PHR carrier groups configured to the terminal device correspond to at least a first PHR configuration and a second PHR configuration, the running of prohibitPHR-Timer according to the first PHR configuration does not block the PHR according to the second PHR configuration.

In one embodiment, the PHR for a PHR carrier group is transmitted based on specific PHR MAC CE format configuration.

In one embodiment, the PHR triggered for the PHR carrier group is transmitted on a carrier belonging to the PHR carrier group.

In a third aspect, a terminal device is provided. The terminal device includes: a processor and a memory. The memory contains instructions executable by the processor, whereby the processor being adapted to cause the network device to perform the method according to the first aspect of the present disclosure.

In a fourth aspect, a network device is provided. The terminal device includes: a processor and a memory. The memory contains instructions executable by the processor, whereby the processor being adapted to cause the network device to perform the method according to the second aspect of the present disclosure.

In a fifth aspect, a computer program product is provided. The computer program product comprises instructions which when executed by at least one processor, cause the at least one processor to operating a PHR for the terminal device, generates a power headroom report (PHR) according to a PHR configuration and a PHR media access control (MAC) control element (CE) format for a PHR carrier group. Then the terminal device transmits the PHR to a network device. The PHR carrier group is associated with one or more carriers.

In a sixth aspect, a computer program product is provided. The computer program product comprises instructions which when executed by at least one processor, cause the at least one processor to operating a PHR for the network device, receives the PHR from a terminal device. The PHR is generated by the terminal device according to a PHR configuration and a PHR MAC CE format for a PHR carrier group. The PHR carrier group is associated with one or more carrier.

According to embodiments of the present disclosure, a power headroom report (PHR) is generated and/or transmitted according to a PHR configuration and a PHR media access control (MAC) control element (CE) format for a PHR carrier group which is specific to a group of carriers on a frequency range, instead of using the same PHR for all the carriers. In this way, The PHR of carriers at high frequencies and, carriers at lower frequencies can be differentially triggered so that the PHRs for all carriers can be reported in time with optimized overhead.

BRIEF DESCRIPTION OF THE DRAWINGS

The above and other aspects, features, and benefits of various embodiments of the disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

The present disclosure will now be discussed with reference to several example embodiments. It should be understood that these embodiments are discussed only for the purpose of enabling those skilled persons in the art to better understand and thus implement the present disclosure, rather than suggesting any limitations on the scope of the present disclosure.

As used herein, the term "wireless communication network" refers to a network following any suitable communication standards, such as LTE-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future.

The term "device" refers to a network device or a terminal device in a wireless communication network.

The term "network device" refers to a device in a wireless communication network via which a terminal device accesses the network and receives services therefrom. The network device refers a base station (BS), an access point (AP), a Mobile Management Entity (MME), Multi-cell/Multicast Coordination Entity (MCE), a gateway, a server, a controller or any other suitable device in the wireless communication network. The BS may be, for example, a node B (NodeB or NB), an evolved NodeB (eNodeB or eNB), a gNB, a Remote Radio Unit (RRU), a radio header (RH), a remote radio head (RRH), a relay, a low power node such as a femto, a pico, and so forth.

Yet further examples of network device include multi-standard radio (MSR) radio equipment such as MSR BSs, network controllers such as radio network controllers (RNCs) or base station controllers (BSCs), base transceiver stations (BTSs), transmission points, transmission nodes, Multi-cell/multicast Coordination Entities (MCEs), core network nodes (e.g., MSCs, MMEs), O&M nodes, OSS nodes, SON nodes, positioning nodes (e.g., E-SMLCs), and/or MDTs. More generally, however, network device may represent any suitable device (or group of devices) capable, configured, arranged, and/or operable to enable and/or provide a terminal device access to the wireless communication network or to provide some service to a terminal device that has accessed the wireless communication network.

The term "terminal device" refers to any end device that can access a wireless communication network and receive services therefrom. By way of example and not limitation, the terminal device refers to a mobile terminal, UE, or other suitable device. The UE may be, for example, a Subscriber Station (SS), a Portable Subscriber Station, a Mobile Station (MS), or an Access Terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

The terminal device may support device-to-device (D2D) communication, for example by implementing a 3GPP standard for sidelink communication, and may in this case be referred to as a D2D communication device.

As yet another specific example, in an Internet of Things (IOT) scenario, a terminal device may represent a machine or other device that performs monitoring and/or measurements, and transmits the results of such monitoring and/or measurements to another terminal device and/or a network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment that is capable of monitoring and/or reporting on its operational status or other functions associated with its operation.

As used herein, the singular forms "a" and "an" are intended to include the plural forms as well, unless the context clearly indicates otherwise. The terms "comprises," "comprising," "has," "having," "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

Figure 1:
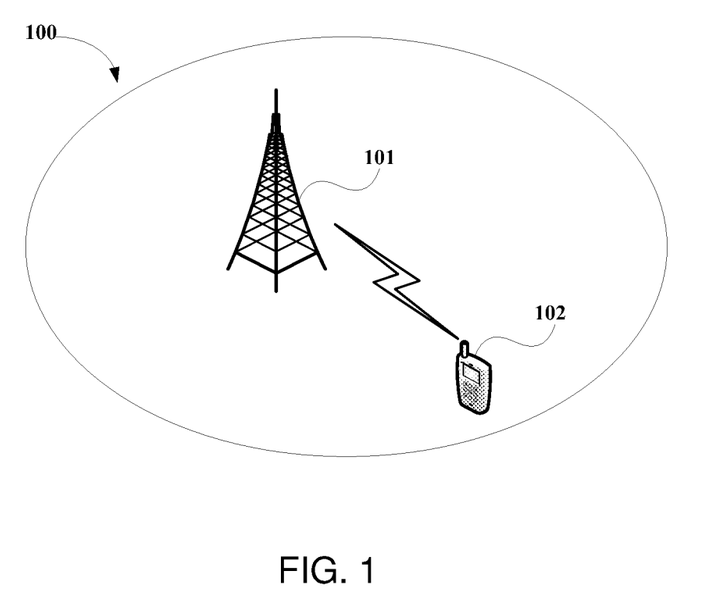
FIG. 1 shows a schematic diagram 100 of a wireless communication network.

Now some exemplary embodiments of the present disclosure will be described below with reference to the figures. Reference is first made to FIG. 1, which shows a schematic diagram 100 of a wireless communication network. In the wireless communication network, a network device 101 manages a serving cell and is also referred to as a "serving network device". A terminal device 102 is served by the serving cell and can generate and transmit a PHR to the network device. It is to be understood that this is only described for example, rather than limitation. Those skilled in the art would appreciate that the neighbor cell may be a cell that is managed by the serving network device other than the serving cell.

It is also to be understood that the configuration of FIG. 1 is described merely for the purpose of illustration, without suggesting any limitation as to the scope of the present disclosure. Those skilled in the art would appreciate that the wireless communication network 100 may include any suitable number of terminal devices and/or network devices and may have other suitable configurations.

New radio, NR will support carrier frequencies from below 1 GHz to 100 GHz. For such huge frequency range, the attenuation characteristics can be very different between carriers with large frequency difference. Typically, the received power in the receiver side can be expressed as the following formula:

$$P_{rx} = P_{TX} \cdot G_{TX} \cdot G_{RX} \left(\frac{1}{4\pi r f}\right)^2 \cdot e^{-ar}$$

wherein $P_{TX}$ is the transmit power by the transmitter; $G_{TX}$ and $G_{RX}$ are the gains of the transmitter and receiver antennas, respectively; r is the separation between the transmitter and receiver, f is the carrier frequency; α is the attenuation factor due to absorption in the medium. From the formula, it is evident that the attenuation of radio wave is proportional to $f^2$. With the same propagation distance, 60 GHz attenuates 29.5 dB more compared to 2 GHz without considering the absorption in the medium.

In 3GPP TS 36.331-e220, the PHR configuration for a UE is configured in the MAC-MainConfig IE. There are both configurations with respect to the PHR triggering and the MAC CE format for PHR content carrying. One set of parameters are applied for aggregated carriers belong to one MAC entity. For PHR triggering, there are 3 parameters:

periodicPHR-Timer, the interval for the periodical PH report.

prohibitPHR-Timer, the PH report is prohabitted when this timer is running, which is used to avoid too frequent PHRs.

dl-PathlossChange: when the pathloss change of a carrier exceeds this threshold, a new PH is estimated. Whether the estimated PH is reported with a PHR in PUSCH further depends on the status of the timers.

The parameters can be configured via RRC signaling, shown as below.

```
MAC-MainConfig ::=      SEQUENCE {
...
  phr-Config            CHOICE {
    release             NULL,
    setup               SEQUENCE {
      periodicPHR-Timer   ENUMERATED {sf10, sf20, sf50, sf100,
                                      sf200, sf500, sf1000,
                                      infinity},
      prohibitPHR-Timer   ENUMERATED {sf0, sf10, sf20, sf50,
                                      sf100, sf200, sf500,
                                      sf1000},
      dl-PathlossChange   ENUMERATED {dB1, dB3, dB6,
    }                                 infinity}
  ...
                                      OPTIONAL,   -- Need ON
}
```

In 3GPP TS 36.321-e20, there are multiple different MAC CE formats defined for PHR report and different MAC CE formats can be used in different cases.

FIGS. 2A-2G show the PHR configurations in different case scenarios, respectively.

Figure 2A:
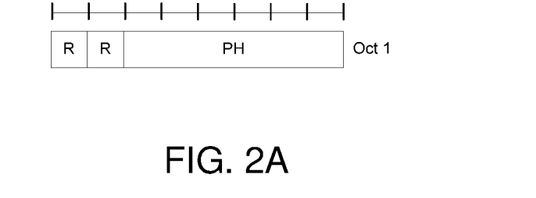
FIG. 2A-2E show several PHR MAC CE format definitions in the existing solutions.

FIG. 2A shows the PHR MAC control element for the PHR for single carrier which has fixed size. The Power Headroom Report (PHR) MAC control element is identified by a MAC PDU subheader with LCID as specified in table 6.2.1-2 in 3GPP TS 36.321-e20. It comprises one byte with two reserved bits.

Figure 2B:
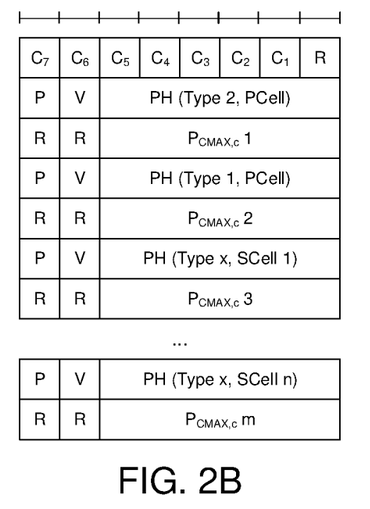

FIG. 2B shows the PHR MAC control element for the extended PHR which has a variable size. For extendedPHR, the Extended Power Headroom Report (PHR) MAC control element is identified by a MAC PDU subheader with LCID as specified in table 6.2.1-2 in 3GPP TS 36.321-e20. and is defined in Figure FIG. 2B.

Figure 2C:
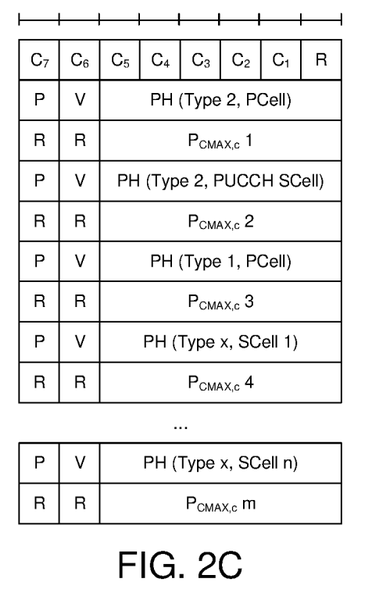

FIG. 2C shows Extended PHR MAC Control Element supporting PUCCH on SCell For extendedPHR2.

Figure 2D:
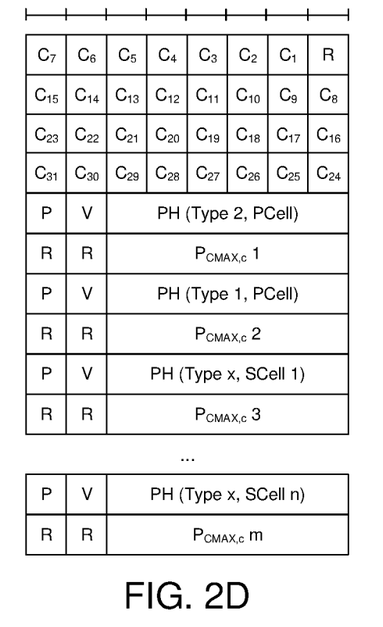

FIG. 2D shows Extended PHR MAC Control Element supporting 32 serving cells with configured uplink.

Figure 2E:
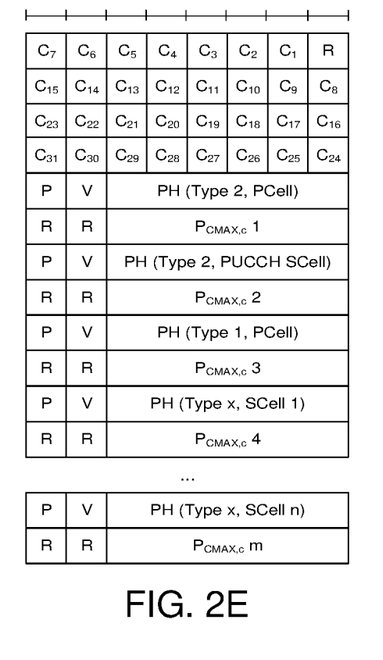

FIG. 2E shows Extended PHR MAC Control Element supporting 32 serving cells with configured uplink and PUCCH on Scell.

The Extended Power Headroom Report (PHR) MAC control elements are identified by a MAC PDU subheader with LCID as specified in table 6.2.1-2 in 3GPP TS 36.321-e20. They have variable sizes and are defined in FIG. 2C, FIG. 2D and FIG. 2E. One octet with C fields is used for indicating the presence of PH per SCell when the highest SCellIndex of SCell with configured uplink is less than 8, otherwise four octets are used.

The detail interpretation of the fields in the MAC CE listed above can be found in 3GPP TS 36.321-e20.

In a carrier aggregation scenario, the operating frequency may span from a low range (e.g., below 6 GHz) up to a high range (e.g., above 30 GHz). So the propagation may vary considerably between carriers. In the current specification, all the carriers share the same MAC entity, which means that they use the same PHR configuration, including triggering setting and the timer setting. Application of a uniform PHR for all carriers would result in that either PHR overhead is increased due to too frequent PHR triggering for some carriers or suboptimal PHR for some carriers due to too late PHR triggering.

It is elaborated in more details in one example where a UE is configured with two carriers: a carrier at 1 G Hz is aggregated with another carrier at 30 GHz.

On one hand, the propagation loss difference between two carriers at the same propagation distance is up to 29.5 dB. The setting of the parameter dl-PathlossChange (e.g. 1 or 3 dB) which is suitable with the low frequency carrier at 1 GHz may be not suitable for the carrier at 30 GHz, since the path loss change of the latter carrier is larger. While the setting of the parameter dl-PathlossChange which is suitable with the carrier at 30 GHz (e.g., 6 dB) may not fit for the carrier at 1 GHz, since its path loss change is smaller.

On another hand, the path loss change of the carrier at 30 GHz is faster than that of the carrier at 1 GHz. Therefore, the PH report for high carrier frequency is required to be more frequent than that of a lower carrier frequency. This means that it is not feasible to have the same timer settings for both carriers.

In order to solve the above and other potential problems, embodiments of the present disclosure provide solutions for reporting a PHR. In the proposed solution, a power headroom report (PHR) is generated according to a PHR configuration and a PHR media access control (MAC) control element (CE) format for a PHR carrier group which is specific to a group of carriers, instead of using the same PHR configuration and the same MAC CE format for all the carriers. In this way, the PHR of carriers at high frequencies and, carriers at lower frequencies can be differentially triggered so that the PHRs for all carriers can be reported in time with optimized overhead.

More details of embodiments of the present disclosure will be discussed with reference to FIGS. 3 to 7 below.

Figure 3:
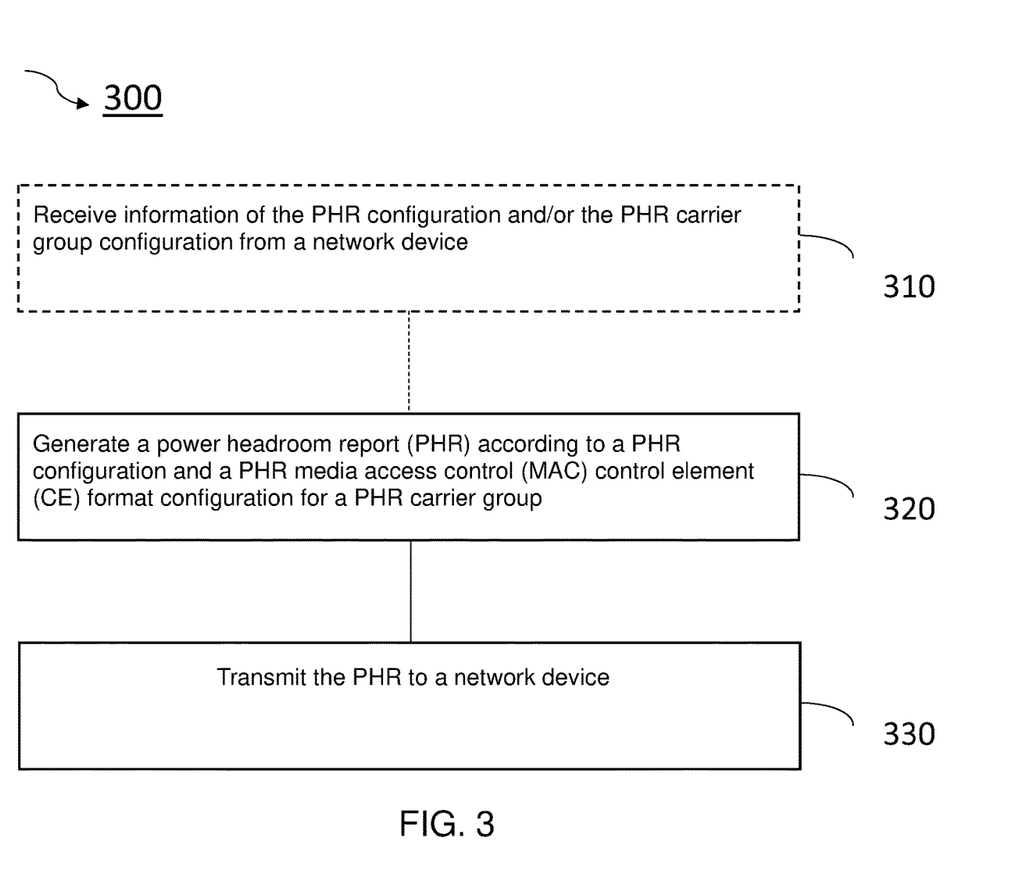
FIG. 3 shows a flowchart of a method 300 of operating the terminal device in accordance with an embodiment of the present disclosure.

FIG. 3 shows a flowchart of a method 300 of operating a terminal device 102 in accordance with an embodiment of the present disclosure. With the method 300, the above and other potential deficiencies in the conventional approaches can be overcome. It would be appreciated by those skilled in the art that the method 300 may be implemented by a terminal device, such as a terminal device 102 or other suitable devices.

The method 300 is entered at block 320, where the terminal device generates a power headroom report (PHR) according to a PHR configuration and a PHR media access control (MAC) control element (CE) format for a PHR carrier group. At block 330 the terminal device transmits the PHR to a network device.

As an option, the method 300 may starts with block 310, where the terminal device receives information of the PHR configuration and/or the PHR carrier group configuration. The information of the PHR configuration and/or the PHR carrier group configuration could be transmitted from the network device 101. Alternatively, the information of the PHR configuration and/or the PHR carrier group configuration could be derived by the terminal device according to predefined rule(s).

According to embodiments of the present disclosure, the PHR carrier group is associated with one or more aggregated carriers. The PHR carrier group corresponds to a frequency range and each PHR carrier group has or corresponds to a specific PHR configuration. The carriers within a certain frequency range belong to a PHR carrier group. All aggregated carriers belonging to same MAC entity can be categorized into one or multiple PHR carrier groups and each could be associated with a group index. Each PHR carrier group can be configured with or correspond to a separate PHR configuration which could be specific to the group. All the carriers of a PHR carrier group have a same PHR carrier configuration which is configured to the group. In the disclosure, the PHR configuration for a PHR carrier group may refer to a PHR configuration assigned to or designated to a PHR carrier group. An example is illustrated in Table 1 as below.

TABLE 1

An example of PHR carrier group and the PHR carrier group specific PHR configuration

| Group index | Carriers | PHR configuration |
| --- | --- | --- |
| PHR carrier group 1 | All carriers below 6 GHz | PHR configuration 1 (large periodicPHR-Timer, large prohibitPHR-Timer and small dl-PathlossChange) |
| PHR carrier group 2 | All carriers within 6~30 GHz | PHR configuration 2 (medium periodicPHR-Timer, medium prohibitPHR-Timer and medium dl-PathlossChange) |
| PHR carrier group 3 | All carriers above 30 GHz | PHR configuration 3 (small periodicPHR-Timer, small prohibitPHR-Timer and large dl-PathlossChange) |

As shown in Table 1 above, an example of PHR carrier group and the corresponding frequency range and PHR configuration is provided. In the example, there are three PHR carrier groups, the PHR carrier groups are categorized based on the frequency range of the carriers such as below 6 GHz, 6~30 GHz and above 30 GHz. Accordingly, each of the groups corresponds to a PHR configuration. PHR carrier group 1 with carriers of the range of below 6 GHz may correspond to PHR configuration 1 of large periodicPHR-Timer, large prohibitPHR-Timer and small dl-Pathloss-Change. Those skilled in the art may understand this example is only illustrated for understanding but not limitations, there are also other ways of categorizations of the groups and the range of the groups could be different from the example shown above. For instance, there could be more than 3 groups such as 4-10 groups. The frequency range could be adjusted accordingly for the actual needs.

As example, if a terminal device is configured with two carriers, one carrier is at a frequency of 5 GHz and another carrier is at a frequency of 35 GHz, then the network device may determine PHR carrier group 1 comprising the carrier at 5 GHz frequency band and PHR carrier group 3 comprising the carrier at 35 GHz frequency band. Then the network device determines PHR configuration 1 for PHR carrier group 1 and PHR carrier group 3 respectively for the terminal device. Afterwards, the network device transmits the PHR configuration 1 and PHR configuration 3 to the terminal device. The example is provided for the way of illustration but not limitation. The terminal device could be configured with three or more carriers, such as 3 carriers on frequencies of 4 GHz, 35 GHz and 50 GHz respectively. Or alternatively, the information of the PHR carrier group is derived by the terminal device and the terminal device may determine the PHR configuration applicable for a PHR carrier group.

In some embodiments, the higher frequency range the PHR carrier group corresponds to, the PHR carrier group has a PHR configuration with one or more of smaller periodicPHR-Timer, smaller prohibitPHR-Timer and larger dl-PathlossChange. Using example 1 for illustration but not limitation herein, the carriers for PHR carrier group 1 correspond to frequencies below 6 GHz and the PHR configuration for the group includes at least one of large periodicPHR-Timer, large prohibitPHR-Timer and small dl-PathlossChange, in comparison, the carriers for PHR carrier group 3 correspond to higher frequencies above 30 GHz and the PHR configuration for the group includes at least one of small periodicPHR-Timer, small prohibitPHR-Timer and large dl-PathlossChange. With the design of the PHR carrier group configuration corresponding to the frequency of carrier, the PHR can be triggered in a timer manner with optimal overhead.

In some embodiments, the PHR configuration for a PHR carrier group includes one or more of periodicPHR-Timer, prohibitPHR-Timer and dl-PathlossChange. As an option, the PHR configuration may include other parameters besides of periodicPHR-Timer, prohibitPHR-Timer and dl-PathlossChange.

In some embodiments, the PHR configuration for the terminal device is configured in the MAC-Main Config IE. The same PHR formats as what are defined in LTE standard such as 3GPP TS 36.331-e220 can be reused for the proposed solution of the disclosure. For one instance, for a PHR carrier group including a single carrier, a MAC CE format as what is shown in FIG. 2A can be used for PHR transmission. For another instance, for a PHR carrier group including between 2 to 8 carriers, a MAC CE format as that in FIG. 2B can be used for PHR transmission. For a PHR carrier group including more than 8 carriers, the PHR MAC CE format as what is shown in FIGS. 2D and 2E can be applied. Those skilled in the art can refer to the 3GPP TS 36.321-e20 and thus more description is omitted herein.

In some embodiments, new MAC CE format may be defined in NR. For instance, a MAC CE format with 16-bit bitmap (R, C1, C2, C3, . . . , C15) indicates the presence of PHs for up to 16 carriers. It can be used when the number of carriers in a PHR carrier group is up to 16 carriers. As another instance, a MAC CE format with 24-bit bitmap (R, C1, C2, C3, . . . , C24) indicates the presence of PHs for up to 24 carriers. It can be used when the number of carriers in a PHR carrier group is up to 24 carriers.

In some embodiments, a plurality of terminal devices served by a serving cell whose carriers are in the same frequency range are configured with common PHR configurations, the common PHR configurations are conveyed via system information for a PHR carrier group to the terminal devices.

In some embodiments, the PHR carrier group and the PHR configuration can be UE-specific, so that each terminal device may have its own setting, since each terminal device may be connected with different component carriers, each terminal device is configured with a PHR configuration of a PHR carrier group for each of the different component carriers. The information on the PHR configuration and/or the PHR carrier group can be transmitted via a dedicated radio resource control signaling.

In some embodiments, the terminal device is configured with more than one PHR carrier group and the PHR of each PHR carrier group is triggered and transmitted independently. For example, the PHR for the carrier on a frequency 5 GHz is triggered and transmitted independently from the PHR for the carrier on a frequency 35 GHz.

In some embodiment, the more than one PHR carrier groups configured to the terminal device correspond to a first PHR configuration and a second PHR configuration, the running of prohibitPHR-Timer according to the first PHR configuration does not block the PHR according to the second PHR configuration so that a first PHR according to the first PHR configuration can operate (including triggering, transmitting) independently from a second PHR according to the second PHR configuration. For example, the first PHR configuration may be the PHR configuration corresponding to PHR carrier group 1 and the second PHR configuration may be the PHR configuration corresponding to PHR carrier group 2 shown in Table 1 of this disclosure.

In some embodiments, the PHR of a PHR carrier group is transmitted based on specific PHR MAC CE format configuration. And the PHR triggered for the PHR carrier group is transmitted on a carrier belonging to the PHR carrier group. In this way, the network device can identify the carriers/carrier group which sends the PHR upon reception of a PHR.

In view of the above method, a power headroom report (PHR) is generated and/or transmitted according to a PHR configuration and a PHR media access control (MAC) control element (CE) format for a PHR carrier group which is specific to a group of carriers on a frequency range, instead of using the same PHR for all the carriers. In this way, The PHR of carriers at high frequencies and, carriers at lower frequencies can be differentially triggered so that the PHRs for all carriers can be reported in time with optimized overhead.

Figure 4:
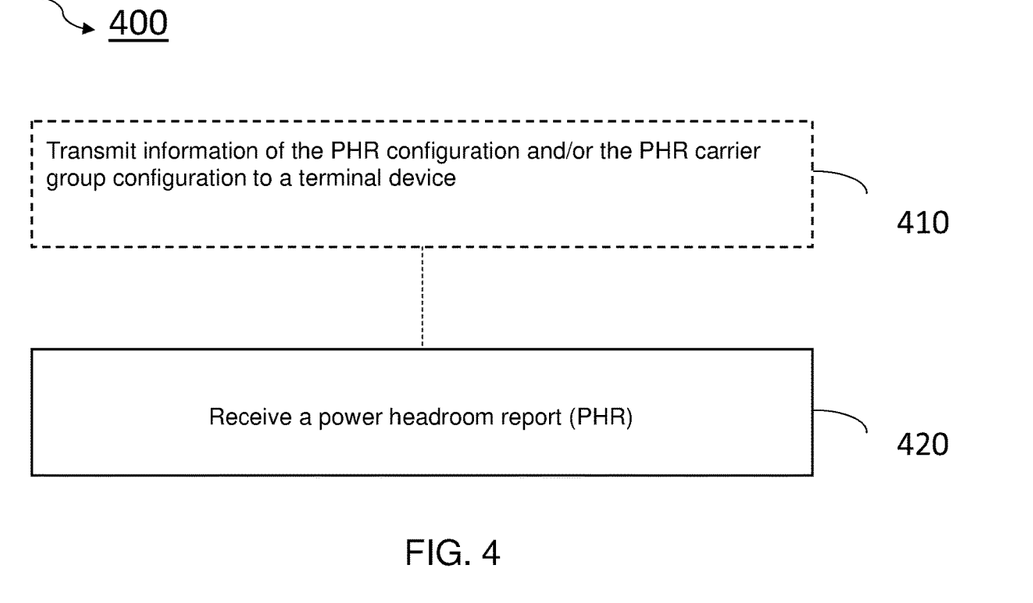
FIG. 4 shows a flowchart of a method 400 of operating the network device in accordance with an embodiment of the present disclosure.

FIG. 4 shows a flowchart of a method 400 of operating a network device 101 in accordance with an embodiment of the present disclosure. With the method 400, the above and other potential deficiencies in the conventional approaches can be overcome. It would be appreciated by those skilled in the art that the method 400 may be implemented by a terminal device, such as a network device 101 or other suitable devices.

The method 400 is entered at block 420, where the network device receives a power headroom report (PHR) from the terminal device. At block 430 the terminal device transmits the PHR to a network device. The PHR is generated by the terminal device according to a PHR configuration and a PHR MAC CE format for a PHR carrier group, the PHR carrier group is associated with one or more carriers.

As an option, the method 400 may starts with block 410, where the network device transmits information of the PHR configuration and/or the PHR carrier group configuration to the terminal device. The PHR configuration and/or the PHR carrier group configuration could be derived by the network device according to predefined rule(s).

According to embodiments of the present disclosure, the PHR carrier group is associated with one or more aggregated carriers. The PHR carrier group corresponds to a frequency range and each PHR carrier group has a specific PHR configuration. The carriers within a certain frequency range belong to a PHR carrier group. All aggregated carriers belonging to same MAC entity can be categorized into one or multiple PHR carrier groups and each could be associated with a group index. Each PHR carrier group can be configured with a separate PHR configuration which could be specific to the group. All the carriers of a PHR carrier group have a same PHR carrier configuration which is configured to the group. An example is illustrated in Table 1 above.

In view of the above method, a power headroom report (PHR) is generated and/or transmitted according to a PHR configuration and a PHR media access control (MAC) control element (CE) format for a PHR carrier group which is specific to a group of carriers at a frequency range, instead of using the same PHR for all the carriers. In this way, The PHR of carriers at high frequencies and, carriers at lower frequencies can be differentially triggered so that the PHRs for all carriers can be reported in time with optimized overhead.

Figure 5:
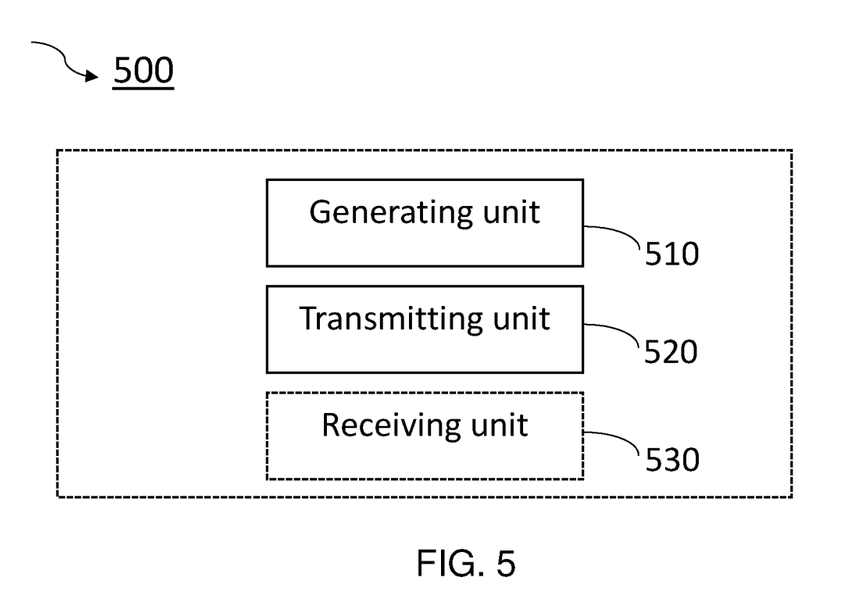
FIG. 5 shows a block diagram of an apparatus 500 implemented at a terminal device in accordance with an embodiment of the present disclosure.

FIG. 5 shows a block diagram of an apparatus 500 implemented at a terminal device in accordance with an embodiment of the present disclosure. It would be appreciated that the apparatus 500 may be implemented at a terminal device, for example, the terminal device 102 or any other suitable device.

As shown, the apparatus 500 includes a generating unit 510, a transmitting unit 520. The generating unit 510 is configured to generate a power headroom report (PHR) according to a PHR configuration and a PHR media access control (MAC) control element (CE) format for a PHR carrier group. The transmitting unit 520 is configured to transmit the PHR to a network device. Wherein the PHR carrier group is associated with one or more aggregated carriers.

In an embodiment, the apparatus 500 may further include a receiving unit 530, the receiving unit is configured to receive information of the PHR configuration and/or the PHR carrier group configuration. The information of the PHR configuration and/or the PHR carrier group configuration can be transmitted from the network device, or alternatively, the information of the PHR configuration and/or the PHR carrier group configuration can be derived by the terminal device according to predefined rule(s).

Figure 6:
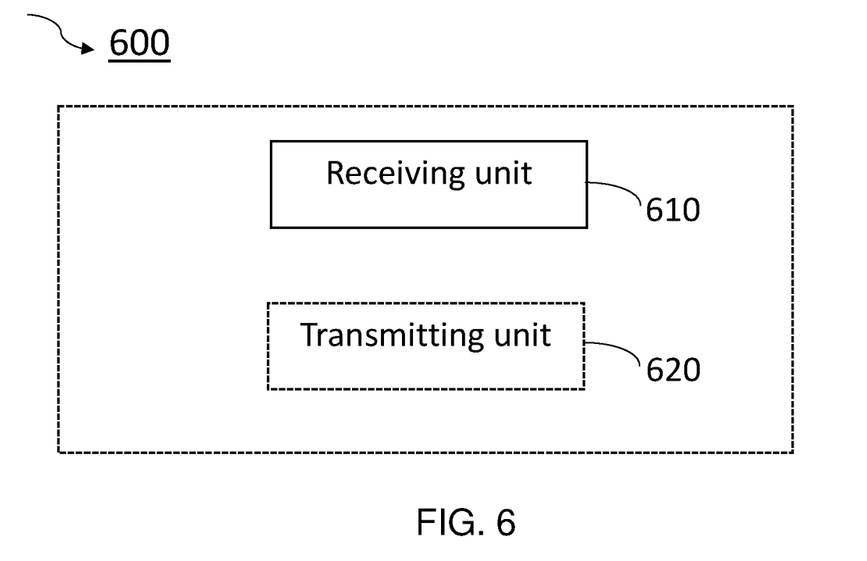
FIG. 6 shows a block diagram of an apparatus 600 implemented at a network device in accordance with an embodiment of the present disclosure.

FIG. 6 shows a block diagram of an apparatus 600 implemented at a network device in accordance with an embodiment of the present disclosure. It would be appreciated that the apparatus 600 may be implemented at a network device, for example, the network device 101 or any other suitable device.

As shown, the apparatus 600 includes a receiving unit 610. The receiving unit 610 is configured to receive a PHR from a terminal device. The PHR is generated by the terminal device according to a PHR configuration and a PHR MAC CE format for a PHR carrier group, the PHR carrier group is associated with one or more carriers.

In an embodiment, the apparatus 600 may further include a transmitting unit 620, the transmitting unit is configured to transmit information of the PHR configuration and/or the PHR carrier group configuration to the terminal device. The information of the PHR configuration and/or the PHR carrier group configuration can be transmitted from the network device, or alternatively, the information of the PHR configuration and/or the PHR carrier group configuration can be derived by the terminal device according to predefined rule(s).

It should be appreciated that components included in the apparatuses 500 and 600 correspond to the operations of the methods 300 and 400, respectively. Therefore, all operations and features described above with reference to FIGS. 3 and 4 are likewise applicable to the components included in the apparatuses 500 and 600 and have similar effects, respectively. For the purpose of simplification, the details will be omitted.

The components included in the apparatus 500 or 600 may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the components included in the apparatus 500 or 600 may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

In accordance with embodiments of the present disclosure, there is provided an apparatus implemented at a terminal device. The apparatus includes: means for generating a power headroom report (PHR) according to a PHR configuration and a PHR media access control (MAC) control element (CE) format for a PHR carrier group; means for transmitting the PHR to a network device, wherein the PHR carrier group is associated with one or more carriers.

In an embodiment, the apparatus may further include means receiving information of the PHR configuration and/or the PHR carrier group configuration.

In accordance with embodiments of the present disclosure, there is provided an apparatus implemented at a network device. The apparatus includes: means for receiving a PHR from a terminal device, the PHR is generated by the terminal device according to a PHR configuration and a PHR MAC CE format for a PHR carrier group, the PHR carrier group is associated with one or more carriers.

The apparatus may further include means for transmitting information of the PHR configuration and/or the PHR carrier group configuration to the terminal device.

Figure 7:
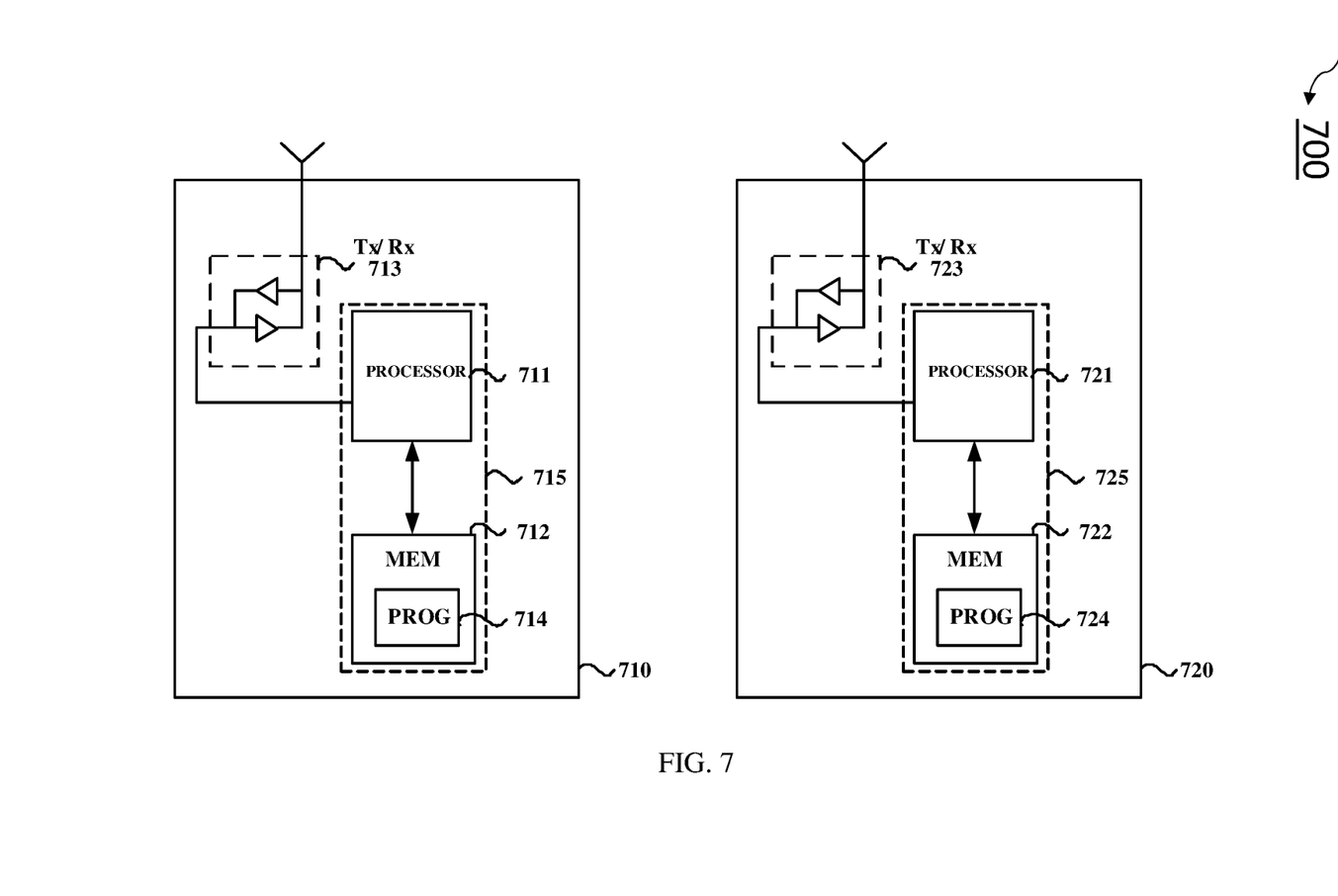
FIG. 7 shows a simplified block diagram 700 of a device that is suitable for use in implementing embodiments of the present disclosure.

FIG. 7 illustrates a simplified block diagram of an apparatus 710 that may be embodied as/in a terminal device, e.g., the terminal device 500 and an apparatus 720 that may be embodied as/in a network device, e.g., the network device 600.

The apparatus 710 may include one or more processors 711, such as a data processor (DP) and one or more memories (MEM) 712 coupled to the processor 711. The apparatus 710 may further include a transmitter TX and receiver RX 713 coupled to the processor 711. The MEM 712 may be non-transitory machine readable storage medium and it may store a program (PROG) 714. The PROG 714 may include instructions that, when executed on the associated processor 711, enable the apparatus 710 to operate in accordance with the embodiments of the present disclosure, for example to perform the method 300. A combination of the one or more processors 711 and the one or more MEMs 712 may form processing means 715 adapted to implement various embodiments of the present disclosure.

The apparatus 720 includes one or more processors 721, such as a DP, and one or more MEMs 722 coupled to the processor 721. The apparatus 720 may further include a suitable TX/RX 723 coupled to the processor 721. The MEM 722 may be non-transitory machine readable storage medium and it may store a PROG 724. The PROG 724 may include instructions that, when executed on the associated processor 721, enable the apparatus 720 to operate in accordance with the embodiments of the present disclosure, for example to perform the method 400. A combination of the one or more processors 721 and the one or more MEMs 722 may form processing means 725 adapted to implement various embodiments of the present disclosure.

Various embodiments of the present disclosure may be implemented by computer program executable by one or more of the processors 711 and 721, software, firmware, hardware or in a combination thereof.

The MEMs 712 and 722 may be of any type suitable to the local technical environment and may be implemented using any suitable data storage technology, such as semiconductor based memory terminal devices, magnetic memory terminal devices and systems, optical memory terminal devices and systems, fixed memory and removable memory, as non-limiting examples.

The processors 711 and 721 may be of any type suitable to the local technical environment, and may include one or more of general purpose computers, special purpose computers, microprocessors, digital signal processors DSPs and processors based on multicore processor architecture, as non-limiting examples.

According to embodiments of the present disclosure, a power headroom report (PHR) is generated according to a PHR configuration and a PHR media access control (MAC) control element (CE) format for a PHR carrier group which is specific to a group of carriers, instead of using the same PHR for all the carriers. In this way, the PHR of carriers at high frequencies and, carriers at lower frequencies can be differentially triggered so that the PHRs for all carriers can be reported in time with optimized overhead.

In addition, the present disclosure may also provide a memory containing the computer program as mentioned above, which includes machine-readable media and machine-readable transmission media. The machine-readable media may also be called computer-readable media, and may include machine-readable storage media, for example, magnetic disks, magnetic tape, optical disks, phase change memory, or an electronic memory terminal device like a random access memory (RAM), read only memory (ROM), flash memory devices, CD-ROM, DVD, Blue-ray disc and the like. The machine-readable transmission media may also be called a carrier, and may include, for example, electrical, optical, radio, acoustical or other form of propagated signals—such as carrier waves, infrared signals, and the like.

The techniques described herein may be implemented by various means so that an apparatus implementing one or more functions of a corresponding apparatus described with an embodiment includes not only prior art means, but also means for implementing the one or more functions of the corresponding apparatus described with the embodiment and it may include separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Example embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including hardware, software, firmware, and a combination thereof. For example, in one embodiment, each block of the block diagrams and flowchart illustrations, and combinations of blocks in the block diagrams and flowchart illustrations can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

The invention claimed is:

1. A method of operating a terminal device with respect to a wireless communication network, the method comprising:
triggering a power headroom report (PHR) for a particular carrier group, according to a specific PHR configuration determined for the particular carrier group, wherein the particular carrier group is one among two or more carrier groups encompassed by a carrier aggregation associated with the terminal device, the two or more carrier groups corresponding to different carrier-frequency ranges and having different specific PHR configurations; and
transmitting, for a network node of the wireless communication network, the PHR for the particular carrier group, according to a specific PHR media access control (MAC) control element (CE) format determined for the particular carrier group, wherein the two or more carrier groups have different specific PHR MAC CE formats.

2. The method of claim 1, further comprising determining the specific PHR configurations and the specific PHR MAC CE formats according to signaling received from the wireless communication network by the terminal device.

3. The method of claim 1, wherein one or more parameters for triggering PHRs differ between the specific PHR configurations, and wherein the one or more differing parameters account for differences in attenuation characteristics between the different carrier-frequency ranges.

4. The method of claim 1, wherein triggering the power headroom report (PHR) for the particular carrier group comprises triggering the PHR according to a PHR periodicity indicated by the specific PHR configuration determined for the particular carrier group, and wherein the specific PHR configurations for different carrier groups among the two or more carrier groups specify different PHR periodicities.

5. The method of claim 1, wherein triggering the power headroom report (PHR) for the particular carrier group comprises triggering the PHR responsive to a detected path-loss change associated with the particular carrier group exceeding a specified threshold, and wherein the specific PHR configurations for different carrier groups among the two or more carrier groups have different specified thresholds.

6. The method of claim 1, wherein a first carrier group among the two or more carrier groups involves a higher carrier-frequency range than a second carrier group among the two or more carrier groups, and wherein the specific PHR configuration for the first carrier group specifies, in comparison to the specific PHR configuration for the second carrier group, one or more of:
a smaller timer value for triggering periodic PHRs;
a smaller timer value for prohibiting PHRs; and
a larger threshold for triggering PHRs responsive to detected changes in path loss.

7. A terminal device configured for operation with a wireless communication network, the terminal device comprising:
a receiver and transmitter; and
processing circuitry configured to:
trigger a power headroom report (PHR) for a particular carrier group, according to a specific PHR configuration determined for the particular carrier group, wherein the particular carrier group is one among two or more carrier groups encompassed by a carrier aggregation associated with the terminal device, the two or more carrier groups corresponding to different carrier-frequency ranges and having different specific PHR configurations; and
transmit the PHR for the particular carrier group, according to a specific PHR media access control (MAC) control element (CE) format determined for the particular carrier group, wherein the two or more carrier groups have different specific PHR MAC CE formats, and wherein the processing circuitry transmits, via the transmitter, the PHR for a network node of the wireless communication network.

8. The terminal device of claim 7, wherein the processing circuitry is configured to determine the specific PHR configurations and the specific PHR MAC CE formats according to signaling received from the wireless communication network via the receiver of the terminal device.

9. The terminal device of claim 7, wherein one or more parameters for triggering PHRs differ between the specific PHR configurations, and wherein the one or more differing parameters account for differences in attenuation characteristics between the different carrier-frequency ranges.

10. The terminal device of claim 7, wherein, for triggering the power headroom report (PHR) for the particular carrier group, the processing circuitry is configured to trigger the PHR according to a PHR periodicity indicated by the specific PHR configuration determined for the particular carrier group, and wherein the specific PHR configurations for different carrier groups among the two or more carrier groups specify different PHR periodicities.

11. The terminal device of claim 7, wherein, for triggering the power headroom report (PHR) for the particular carrier group, the processing circuitry is configured to trigger the PHR responsive to a detected path-loss change associated with the particular carrier group exceeding a specified threshold, and wherein the specific PHR configurations for different carrier groups among the two or more carrier groups have different specified thresholds.

12. The terminal device of claim 7, wherein a first carrier group among the two or more carrier groups involves a higher carrier-frequency range than a second carrier group among the two or more carrier groups, and wherein the specific PHR configuration for the first carrier group specifies, in comparison to the specific PHR configuration for the second carrier group, one or more of:
a smaller timer value for triggering periodic PHRs;
a smaller timer value for prohibiting PHRs; and
a larger threshold for triggering PHRs responsive to detected changes in path loss.

13. A method of operating a network node of a wireless communication network, the method comprising:
determining group-specific triggers to be used by a terminal device for triggering power headroom reports (PHRs), for each of two or more respective groups of carriers included in a carrier aggregation used by the terminal device, wherein the group-specific triggers depend on respective carrier-frequency ranges associated with the two or more respective groups of carriers;
determining group-specific formatting for the two or more respective groups of carriers, to be used by the terminal device for formatting the PHRs sent for each of the two or more respective groups of carriers; and
sending signaling for the terminal device, indicating the group-specific triggers and the group-specific formatting.

14. The method of claim 13, wherein sending the signaling comprises broadcasting indications of one or both the group-specific triggers and the group-specific formatting.

15. The method of claim 13, wherein sending the signaling comprises sending dedicated signaling to the terminal device, indicating one or both of the group-specific triggers and the group-specific formatting.

16. The method of claim 13, wherein the group-specific triggers include one or more parameters for triggering PHRs that differ, as between the two or more respective groups of carriers, and wherein the differing parameters account for differences in attenuation characteristics between the respective carrier-frequency ranges associated with the two or more respective groups of carriers.

17. The method of claim 13, wherein the group-specific triggers specify different PHR periodicities, as between the two or more respective groups of carriers, for triggering periodic PHRs with respect to the two or more respective groups of carriers.

18. The method of claim 13, wherein the group-specific triggers specify different thresholds, as between the two or more respective groups of carriers, for triggering PHRs responsive to detected changes in path loss.

19. The method of claim 13, wherein a first carrier group among the two or more respective carrier groups involves a higher carrier-frequency range than a second carrier group among the two or more respective carrier groups, and wherein the group-specific triggers differ, as between the first and second carrier groups, regarding one or more of:
- a smaller timer value for triggering periodic PHRs;
- a smaller timer value for prohibiting PHRs; and
- a larger threshold for triggering PHRs responsive to detected changes in path loss.

20. The method of claim 13, wherein the group-specific formatting comprises group-specific PHR media access control (MAC) control element (CE) formats determined for the two or more respective groups of carriers.

21. A network node configured for operation in a wireless communication network, the network node comprising:
- a receiver and a transmitter; and
- processing circuitry configured to:
    - determine group-specific triggers to be used by a terminal device for triggering power headroom reports (PHRs), for each of two or more respective groups of carriers included in one or more carrier aggregations used by the terminal device, wherein the group-specific triggers depend on respective carrier-frequency ranges associated with the two or more respective groups of carriers;
    - determine group-specific formatting for the two or more respective groups of carriers, to be used by the terminal device for formatting the PHRs sent for each of the two or more respective groups of carriers; and
    - send, via the transmitter, signaling for the terminal device, indicating the group-specific triggers and the group-specific formatting.

22. The network node of claim 21, wherein the processing circuitry is configured to send the signaling by initiating broadcasting by the network node or by another associated node in the wireless communication network, the broadcasting comprising broadcasting indications of one or both the group-specific triggers and the group-specific formatting.

23. The network node of claim 21, wherein the processing circuitry is configured to send the signaling by initiating dedicated signaling by the network node or by another associated node in the wireless communication network, the dedicated signaling comprising indications of one or both of the group-specific triggers and the group-specific formatting that are sent to the terminal device.

24. The network node of claim 21, wherein the group-specific triggers include one or more parameters for triggering PHRs that differ, as between the two or more respective groups of carriers, and wherein the differing parameters account for differences in attenuation characteristics between the respective carrier-frequency ranges associated with the two or more respective groups of carriers.

25. The network node of claim 21, wherein the group-specific triggers specify different PHR periodicities, as between the two or more respective groups of carriers, for triggering periodic PHRs with respect to the two or more respective groups of carriers.

26. The network node of claim 21, wherein the group-specific triggers specify different thresholds, as between the two or more respective groups of carriers, for triggering PHRs responsive to detected changes in path loss.

27. The network node of claim 21, wherein a first carrier group among the two or more respective carrier groups involves a higher carrier-frequency range than a second carrier group among the two or more respective carrier groups, and wherein the group-specific triggers differ, as between the first and second carrier groups, regarding one or more of:
- a smaller timer value for triggering periodic PHRs;
- a smaller timer value for prohibiting PHRs; and
- a larger threshold for triggering PHRs responsive to detected changes in path loss.

28. The network node of claim 21, wherein the group-specific formatting comprises group-specific PHR media access control (MAC) control element (CE) formats determined for the two or more respective groups of carriers.

* * * * *